United States Patent
MacKinnon et al.

[11] Patent Number: 5,949,802
[45] Date of Patent: Sep. 7, 1999

[54] HIGH EFFICIENCY INTRACAVITY DOUBLED LASER AND METHOD

[75] Inventors: Neil MacKinnon, Sunnyvale; Ping Xie, San Jose, both of Calif.

[73] Assignee: Uniphase Corporation, San Jose, Calif.

[21] Appl. No.: 08/947,203

[22] Filed: Oct. 8, 1997

[51] Int. Cl.[6] ................................................. H01S 3/10
[52] U.S. Cl. .............................. 372/22; 372/92; 372/23; 372/27; 372/19; 372/105; 372/98; 372/106
[58] Field of Search ................................. 372/22, 92, 21, 372/33, 19, 27, 105, 98, 106

[56] References Cited

U.S. PATENT DOCUMENTS

| | | | |
|---|---|---|---|
| 4,413,342 | 11/1983 | Cohen et al. | 372/22 |
| 4,637,026 | 1/1987 | Liu | 372/22 |
| 5,084,879 | 1/1992 | Suzuki et al. | 372/22 |
| 5,249,190 | 9/1993 | Kortz et al. | 372/22 |
| 5,263,038 | 11/1993 | Lukas et al. | 372/22 |
| 5,289,479 | 2/1994 | Oka et al. | 372/22 |
| 5,627,849 | 5/1997 | Baer | 372/92 |

*Primary Examiner*—Leon Scott, Jr.
*Attorney, Agent, or Firm*—Steve Shear; Mike Pritzkau

[57] ABSTRACT

An intracavity doubled single longitudinal mode laser is disclosed which provides stable (i.e., low amplitude variation in its output beam intensity), efficient operation. An associated method is also disclosed. The laser includes an input mirror and an output mirror defining a resonant cavity and a light path within the resonant cavity and between the mirrors. The output mirror is configured to be substantially transparent to an output wavelength produced within the cavity. A lasant material is positioned in the light path for producing light at a desired fundamental wavelength and possibly other, unwanted wavelengths. Polarizing element and a type I doubling material are also positioned in the light path. During operation of the laser, the polarizing element polarizes the desired fundamental wavelength as well as the unwanted wavelengths of light produced by the lasant material. The type I doubling material then produces output wavelengths at twice the frequency of any wavelengths passing therethrough. The type I doubling material and the polarizing element are arranged such that they cooperate in a way which causes the unwanted wavelengths to be subjected to losses which result in the unwanted wavelengths being extinguished while the desired fundamental wavelength is subjected to a level of loss above a lasing threshold so that the desired fundamental wavelength lases, thereby producing the desired output wavelength. In one aspect of the invention, blue light may be produced as the output wavelength with an efficiency which has not been seen previously.

13 Claims, 1 Drawing Sheet

HIGH EFFICIENCY INTRACAVITY DOUBLED LASER AND METHOD

BACKGROUND OF THE INVENTION

The present invention relates generally to intracavity doubled single mode lasers and more particularly to an intracavity doubled single mode laser implementation which exhibits high efficiency in converting light from a fundamental frequency to a doubled, visible frequency. The invention is particularly well suited for efficiently producing visible light in the blue frequency range.

In the prior art, a variety of intracavity doubled lasers have been developed. However, many of these frequency doubled lasers suffer a so called "green noise" problem which limits their usefulness in a number of applications. More specifically, the green noise problem introduces amplitude noise (i.e. variation in the intensity of the output beam at the doubled frequency) which is believed to be due to gain competition between multiple modes present in the laser's resonant cavity in combination with a longitudinal mode coupling phenomenon which is a consequence of a nonlinear doubling process.

One popular approach in solving the green noise problem is to eliminate the multiple modes in the laser light by using a single longitudinal mode (hereinafter SLM) to excite a non-linear material and thereby eliminate longitudinal mode coupling so as to obtain a single, doubled output frequency. However, as will be seen hereinafter, certain problems have been encountered with regard to use of an SLM laser in efficiently producing light at particular frequencies such as, for example, that of blue.

Referring to FIG. 1, as mentioned, one approach for producing a stable output beam at a doubled frequency in accordance with the prior art is to excite a nonlinear material with a single longitudinal mode. In a specific implementation (the physical elements of which are not shown), a type II birefringent nonlinear material cooperates with a polarizing element so as to reject all but a desired fundamental wavelength. FIG. 1 illustrates, in this implementation, the well known orientation of the polarizing element's polarization axis 10 with respect to the ordinary axis 12 and extraordinary axis 14 of the birefringent type II nonlinear material. Specifically, ordinary axis 12 and extraordinary axis 14 are each oriented at an angle of 45° with respect to polarization axis 10. In this way, a Lyot filter is formed in the laser's cavity which serves to discriminate against all but one desired fundamental frequency while providing low insertion loss for the desired mode. It should be appreciated that, in order to achieve useful output power, this implementation is most appropriate in applications where a reasonably efficient nonlinear type II doubling material is available for use at the wavelengths of concern. For example, green output light at 532 nm may be produced with relative efficiency from a 1064 nm fundamental wavelength using type II KTP. Unfortunately, however, the efficient production of blue output light using type II configured materials is complicated by the fact that infrared transitions which, when doubled, yield blue light tend to have a net optical gain around one-tenth of those transitions which yield green light when doubled.

In order to compensate for this lower optical gain, it is desirable to use much more efficient doubling materials. At first appearance, it would seem that certain doubling materials such as, for example, potassium niobate ($KNbO_3$) would serve well in a high efficiency conversion role since this material possesses an effective doubling efficiency for blue interactions which is greater than thirty times that of KTP in green interactions. However, $KNbO_3$ will only phase match blue interactions in a type I configuration such that it is not useful in the orientation of FIG. 1. Therefore, type I doubling materials must be used in other geometries, as will be described immediately hereinafter. These other geometries are typically inefficient as a result of additional intracavity components which constrain the laser to SLM operation. As an example, intracavity etalons are currently the component of choice for defining SLM operation. In most instances, etalons introduce excessive and undesirable insertion losses which significantly reduce the laser's visible light output power. Moreover, intracavity etalons do not constrain the polarization state of the laser in a precise way, thereby reducing the etalon's effectiveness in cases where the gain material being used does not exhibit sufficient gain anisotropy.

Other implementations may also employ type I doubling materials. Examples include "twisted mode" cavity designs, in which a combination of intracavity waveplates is used, and ring lasers. These implementations normally embody complex design considerations and geometries. Ring lasers, in particular, are susceptible to mode-hopping behavior (i.e., noisy).

As will be seen hereinafter, the present invention provides a heretofore unseen and highly advantageous intracavity geometry and associated method which utilizes a type I doubling material in a way that provides stable SLM operation and high efficiency.

SUMMARY OF THE INVENTION

As will be described in more detail hereinafter, an intracavity doubled single longitudinal mode laser is disclosed which provides stable (i.e., low amplitude variation in its output beam intensity), efficient operation. An associated method is also disclosed.

The laser includes an input mirror and an output mirror defining a resonant cavity and a light path within the resonant cavity and between the mirrors. The output mirror is configured to be substantially transparent to an output wavelength produced within the cavity. A lasant material is positioned in the light path for producing light at a desired fundamental wavelength and possibly other, unwanted wavelengths. Polarizing means and a type I doubling material are also positioned in the light path. During operation of the laser, the polarizing means polarizes the desired fundamental wavelength as well as the unwanted wavelengths of light produced by the lasant material. The type I doubling material then produces output wavelengths at twice the frequency of any wavelengths passing therethrough. The type I doubling material and the polarizing means are arranged such that they cooperate in a way which causes the unwanted wavelengths to be subjected to losses which result in the unwanted wavelengths being extinguished while the desired fundamental wavelength is subjected to a level of loss above a lasing threshold so that the desired fundamental wavelength lases, thereby causing the type I material to produce a single, doubled frequency as the output wavelength.

In one aspect of the invention, light in the blue frequency range may be produced with an efficiency which has not been seen heretofore.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
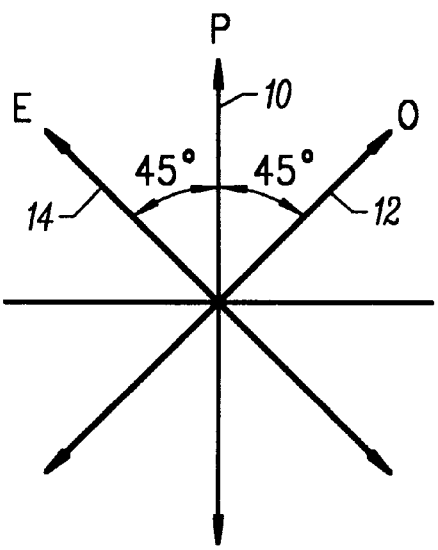
FIG. 1 is a diagrammatic representation looking in one direction along the light path of a prior art laser which uses a type II birefringent doubling material in combination with a polarizing element illustrating a relationship between the ordinary and extraordinary axes of the type II material and the polarizing axis of the polarizing element.
Figure 2:
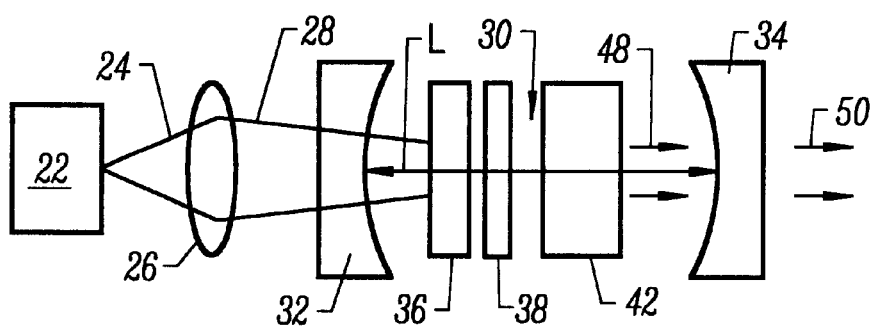
FIG. 2 is a diagrammatic view of a intracavity doubled high efficiency laser manufactured in accordance with the present invention.

Attention is immediately directed to FIG. 2, which diagrammatically illustrates one embodiment of an intracavity doubled single mode laser manufactured in accordance with the present invention. The laser includes a pumping light source 22 which emits a pump beam 24 at a predetermined frequency. Pump beam 24 is directed into a lens 26 and emerges therefrom to form a beam 28. Beam 28 then passes into a resonant cavity 30 through an input mirror 32 which is designed to be highly transmissive at the predetermined frequency of the pumping source while being highly reflective to a fundamental lasing wavelength. An opposing end of the resonant cavity is defined by an output mirror 34. Resonant cavity 30 defines a lasant light path L between the input and output mirrors. It is mentioned that light path L is depicted as being straight for purposes of clarity, however, the light path is not typically straight as a result of the various optical elements disposed along its length.

Continuing to refer to FIG. 2, output mirror 34 is designed to be highly reflective to the fundamental lasing wavelength while being highly transmissive to a frequency at or near double the frequency of the fundamental wavelength. After passing through the input mirror, light beam 28 is incident upon a laser gain medium 36.

Continuing to refer to FIG. 2, pumping light source 22 may be provided in a variety of different forms so long as it produces or emits pump beam 24 at the predetermined frequency which is matched to the laser transitions of the material used as the laser gain medium, as is well known. In one embodiment, a laser diode which emits light at a wavelength at or about 808 nm is used as pumping light source 22. As is well known in the art, laser diodes of this type are readily available. When directed into laser gain medium 36, pump beam 24 excites atomic laser transitions within the laser gain medium which cause the material to produce a range of frequencies/wavelengths in resonant cavity 30 including a desired fundamental frequency as well as other, unwanted frequencies. The fundamental and output frequencies of laser 20 can vary depending upon the specific materials used as the laser gain medium. For purposes of simplicity, the remaining discussion will consider the use of Nd:YAG (neodymium doped YAG) as the laser gain medium with a central fundamental wavelength of 946 nm. However, with the application of the principles described herein, the use of other materials for the laser gain medium will be clear to those of skill in the art in view of this overall disclosure.

Figure 3:
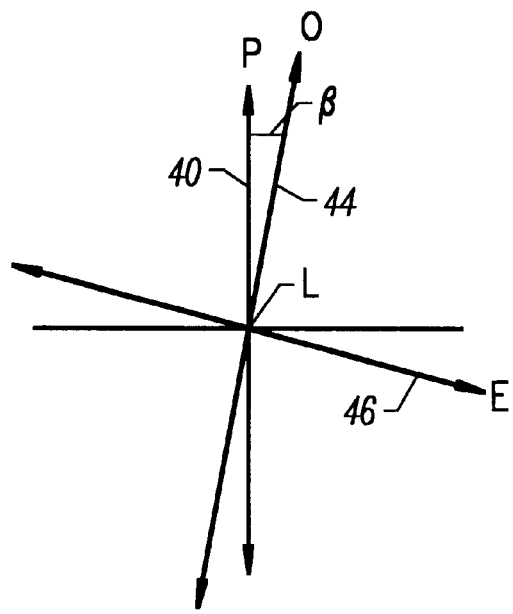
FIG. 3 is a diagrammatic representation looking in one direction along the light path of the laser of FIG. 2 illustrating a relationship between a polarizing axis of a polarizing element in relation to a primary/ordinary axis of a type I birefringent doubling material in accordance with the present invention.

Referring to FIG. 3 in conjunction with FIG. 2, a polarizing element 38 such as, for example, a brewster plate is positioned along light path L such that the fundamental frequencies emitted by the gain material are polarized along a polarization axis 40. It should be understood that any suitable form of polarizing element may be utilized in accordance with the teachings herein. In accordance with the present invention, a type I birefringent nonlinear material 42 is also positioned along light path L. Material 42 includes an ordinary/primary axis 44 and an extraordinary axis 46. As seen in FIG. 3, ordinary axis 44 is oriented so as to be generally transverse to light path L (extending perpendicular to the plane of the figure) while forming an angle β relative to polarization axis 40. Remarkably, it has been empirically discovered that with a relatively small value for β, for example, in the range of 1° to 5°, polarizing element 38 and material 42 cooperate in a way which forms a Lyot filter within resonant cavity 30. It is to be understood that the specified approximate range of β is intended only as exemplary, rather than limiting and that any angle is suitable for use provided only that the desired Lyot effect results. In practicing the present invention, β should be gradually increased only to a point at which sufficient birefringence is introduced in order to establish Lyot filter action. Thereafter, tuning techniques such as, for example temperature tuning are used to select the desired fundamental lasing frequency which, in turn, establishes the doubled output frequency. It is to be understood that the above described arrangement may be varied in any suitable way in accordance with the teachings herein so long as a Lyot filter is defined. For example, ordinary axis 44 may readily be positioned on the opposite side of polarization axis 40 at angle β. Moreover, it should be emphasized that β defines only the relative association between the polarization axis and the ordinary axis of the type I material. Additionally, ordinary axis 44 is preferred to form a slight angle (not shown) off normal with light path L in a known manner so as to minimize coupled cavity and intracavity etalon effects. It is noted that all intracavity optical surfaces should be arranged slightly off normal with respect to light path L for the same reason.

In conventional lasers, type I birefringent materials are typically oriented for maximum conversion efficiency. That is, the ordinary or extraordinary axis of the type I material is arranged parallel with a polarization axis defined within the cavity. In such an orientation, no frequency discrimination is provided by these elements via the Lyot effect. That is, such an implementation will provide a multi-mode, generally unstable output. One might assume that frequency discrimination could be provided in such a parallel axis orientation through the simple expedient of adding an intracavity waveplating element as a way of forming a Lyot filter to simulate the above described type II doubling regime. Unfortunately, however, it is submitted that the birefringence of the type I material, in such a combination, may serve to cancel out the frequency selective depolarization behavior of the type II waveplate. The result will be a very complex interaction between the type I and waveplate materials in which SLM operation will not be achieved.

In contrast, the present invention recognizes that detuning the ordinary axis of Type I material 42 slightly off of polarization axis 40 results in a slight degradation in conversion efficiency (which is minimized by reducing β, as described above), but causes the range of fundamental frequencies possible within the laser cavity to be subjected to the birefringence of the type I material. In this way, the birefringence of the type I material cooperates with polarizing element 38 to provide Lyot filter action with its associated and highly advantageous low insertion loss. As an example, since loss in conversion efficiency due solely to detuning the Type I material is roughly proportional the fourth power of the cosine of β, a loss of less than 2% is experienced for a β=5°. Thus, an intracavity doubled SLM laser is provided at wavelengths such as, for example, that of blue light with an efficiency which has not been seen heretofore at such wavelengths.

It should be appreciated that the operation of laser 20 may be described in essentially the same terms as a prior art laser which uses a type II material in defining a Lyot filter. Specifically, only one desired fundamental wavelength remains unchanged in polarization (retaining polarization along polarization axis 40 of polarizing element 38) after having passed through type I material 42. Precise adjustment of the desired wavelength may be obtained in a known manner, for example, by temperature tuning. Therefore, the desired fundamental wavelength experiences a level of loss in combination with gain provided by gain material 36 which permits the desired wavelength to lase along light path L by remaining above a lasing threshold. Of course, as the desired fundamental passes through type I material 42, frequency doubled light 48 is generated with a high conversion efficiency in an overall efficient and heretofore unseen intracavity geometry, as described above. Since output mirror 34 is highly transmissive at the doubled frequency, frequency doubled light 48 passes through the output mirror as output light 50.

With regard to the unwanted fundamental wavelengths/modes, it should be appreciated that type I material 42 is selected to provide full or half-wave retardation at the desired fundamental wavelength. Any unwanted (unselected) mode present within cavity 30 will have a wavelength such that the unwanted mode will not experience a half-wave or full-wave retardation through birefringent member 28. Therefore, a round-trip through material 42 will result in polarization changes for these unwanted modes. Upon passing through polarizing element 38, the unwanted modes will experience substantial losses as a result of the polarization changes. These losses, in spite of gain provided by gain material 36, will result in power levels for the unwanted modes which place them below lasing threshold such that they are ultimately extinguished over a number of roundtrips within cavity 30.

Since the laser assemblies disclosed herein may be provided in a variety of different configurations and produced using a number of different methods, it should be understood that the present invention may be embodied in many other specific forms without departing from the spirit or scope of the invention. As one example, the arrangement of intracavity elements may be modified in any suitable way provided only that a Lyot filter is formed by arranging the primary axis of a type I doubling material relative to polarized light in a manner which is consistent with the foregoing descriptions. As another example, the teachings of the present invention may be applied in alternative configurations such as a harmonically multiplied configuration which provides for outputting harmonic light frequencies which are bi-directionally generated. Therefore, the present examples and methods are to be considered as illustrative and not restrictive, and the invention is not to be limited to the details given herein, but may be modified within the scope of the appended claims.

What is claimed is:

1. An intracavity doubled single longitudinal mode laser comprising:
    a) an input mirror and an output mirror defining a resonant cavity and a light path within the resonant cavity and between the mirrors, said output mirror being substantially transparent to an output wavelength produced within said cavity;
    b) a lasant material positioned in said light path for producing light at a desired fundamental wavelength and possibly other, unwanted wavelengths;
    c) means positioned in said light path for polarizing said desired fundamental wavelength and said unwanted wavelengths of light; and
    d) a type I doubling material positioned in said light path for producing said output wavelength at twice the frequency of any wavelengths passing therethrough, said type I doubling material and said polarizing means cooperating such that the unwanted wavelengths are subjected to losses which cause the unwanted wavelengths to be extinguished while the desired fundamental wavelength is subjected to a level of loss above a lasing threshold so that the desired fundamental wavelength lases thereby producing a single, doubled frequency as said output wavelength.

2. The laser of claim 1 wherein said polarizing means includes a polarization axis and wherein said type I doubling material includes a principal axis, said polarization axis and said principal axis being arranged such that said desired fundamental wavelength and said unwanted wavelengths are subjected to birefringence which cooperates with the polarization means to extinguish the unwanted modes while the desired fundamental wavelength is permitted to lase.

3. The laser of claim 2 wherein the principal axis of the type I doubling material is arranged generally transverse to said light path and at an angle with respect to the polarization axis of the polarizing means.

4. The laser of claim 3 wherein said angle is in the range of approximately 1° to 5°.

5. The laser of claim 4 wherein said angle is just sufficient to form a Lyot filter with the cooperation of the polarizing means such that the desired fundamental wavelength is subjected to a minimal loss.

6. The laser of claim 1 wherein said type I doubling material is $KNbO_3$.

7. The laser of claim 1 wherein said type I doubling material is configured for producing an output light wavelength as blue light.

8. The laser of claim 1 wherein said polarizing means includes a Brewster plate.

9. A method of producing an intracavity doubled single longitudinal mode laser, said method comprising the steps of:
    a) providing an input mirror and an output mirror defining a resonant cavity and a light path within the resonant cavity and between the mirrors, said output mirror being substantially transparent to an output wavelength produced within said cavity;
    b) locating a lasant material in said light path for producing light at a desired fundamental wavelength and possibly other, unwanted wavelengths;
    c) positioning polarizing means in said light path for polarizing any light present on the light path; and
    d) arranging a type I doubling material along said light path such that the type I doubling material cooperates with the polarizing means in a way which subjects the desired fundamental wavelength and all of the unwanted wavelengths to losses during operation of the laser which cause the unwanted wavelengths to be extinguished while the desired fundamental wavelength experiences a level of loss above a lasing threshold so that the desired fundamental wavelength lases thereby producing a single, doubled frequency as said output wavelength.

10. The method of claim 9 wherein said polarizing means includes a polarization axis and wherein said type I doubling material includes a principal axis, said step of arranging the type I doubling material and the polarizing means including the step of arranging said principal axis relative to said polarization axis such that said desired fundamental wavelength and said unwanted wavelengths are subjected to birefringence which cooperates with the polarization of light along said light path during the operation of the laser in a way which extinguishes the unwanted modes while the desired fundamental wavelength lases.

11. The method of claim 10 wherein said step of arranging said principal axis with respect to said polarization axis includes the step of positioning the principal axis generally transverse to said light path and at an angle with respect to the polarization axis of the polarizing means.

12. The method of claim 10 wherein said angle is in the range of approximately 1° to 5°.

13. The method of claim 11 where said step of positioning the principal axis of the type I material includes the steps of (i) initially arranging the principal axis parallel with the polarization axis and (ii) rotating the type I material by an amount which is just sufficient to form a Lyot filter in cooperation with the polarizing means so as to form said angle such that the desired fundamental wavelength is subjected to a minimal loss.

* * * * *